United States Patent Office 2,726,836
Patented Dec. 13, 1955

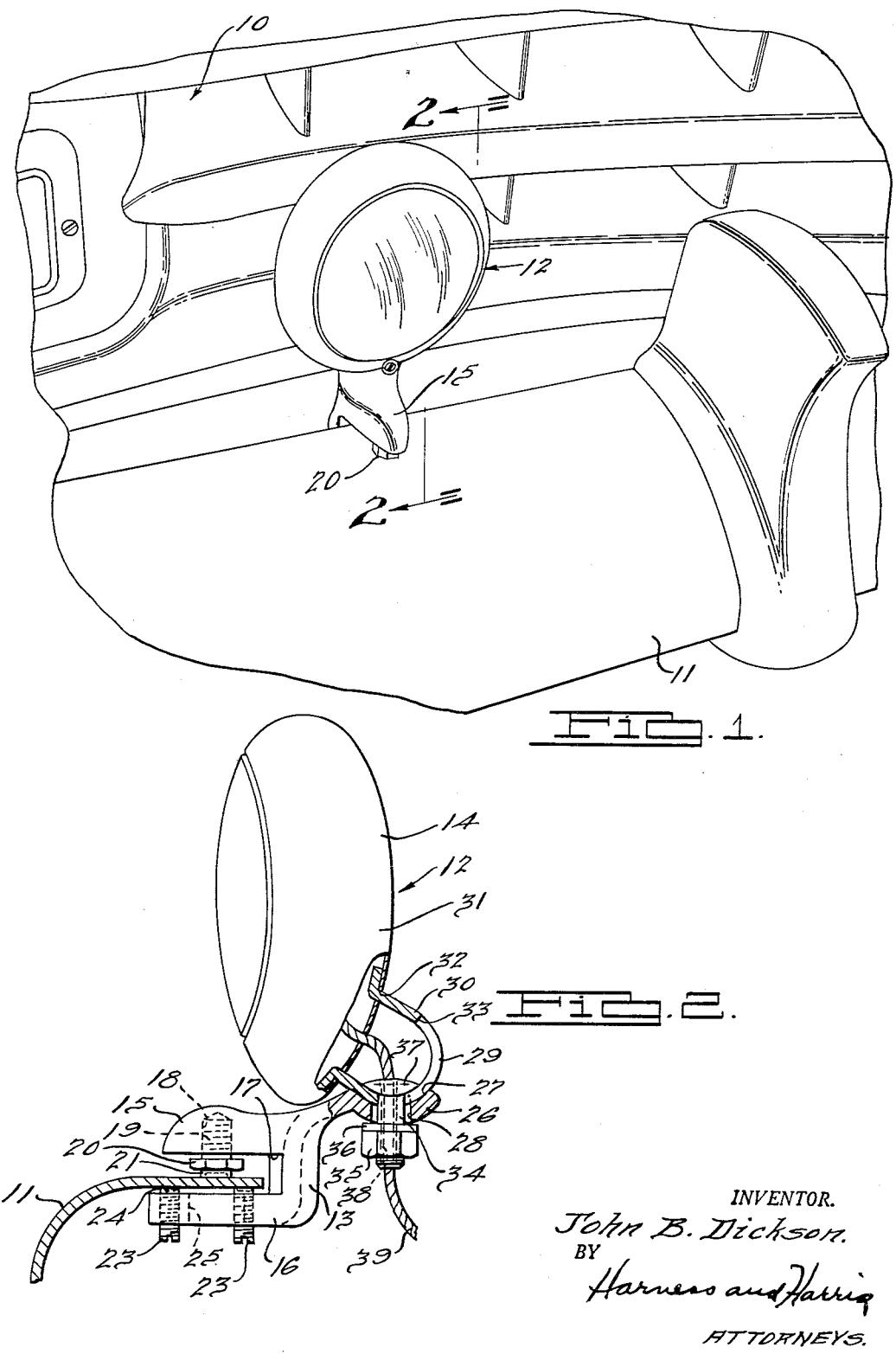
Dec. 13, 1955  J. B. DICKSON  2,726,836
LAMP AND BRACKET ASSEMBLY
Filed July 19, 1950  2 Sheets-Sheet 1
INVENTOR.
John B. Dickson.
BY
Harness and Harris
ATTORNEYS.

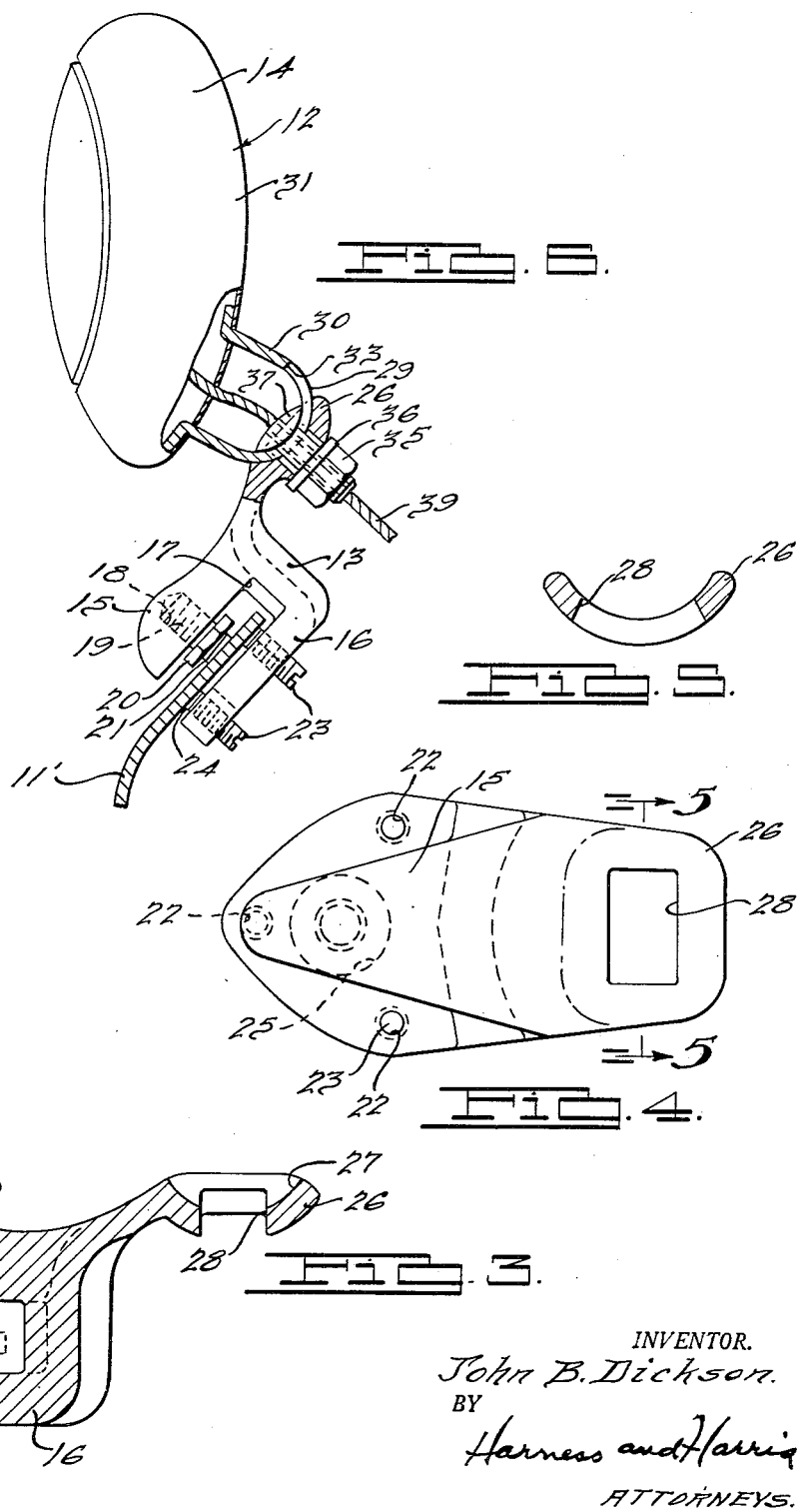

2,726,836

LAMP AND BRACKET ASSEMBLY

John B. Dickson, Highland Park, Mich., assignor to Chrysler Corporation, Highland Park, Mich., a corporation of Delaware Application July 19, 1950, Serial No. 174,649

1 Claim. (Cl. 248—214)

My invention relates to fixture supporting means and more particularly to an improved bracket and lamp assembly for use on a motor vehicle.

In the past, various and complicated structures have been employed to secure accessory lamps to a motor vehicle. These structures have been characterized by bulkiness, unpleasant appearance, and difficultness of attachment.

It is a principal object of the present invention to provide an improved lamp and mounting bracket assembly which is easily and readily attached to a supporting structure.

Another object of my invention is to provide an improved lamp and mounting bracket assembly which is readily securable to the straight or curved portions of the front or rear bumper of a motor vehicle.

Another object of my invention is to provide a novel bracket for a lamp which is relatively small compared to those known in the art and which presents a very attractive appearance.

A further object of my invention is to provide an improved lamp assembly which permits adjustment of the lamp through a relatively wide range of positions.

Other objects of my invention are to provide a motor vehicle with an improved lamp mounting bracket which is readily adaptable to conventional vehicle bumpers; which has a final adjustment accessible from the front side of the bumper and which is easily and economically manufactured.

Other objects and advantages will become more apparent from the following description of one embodiment of my invention, reference being had to the accompanying drawings in which:

Fig. 1 is a perspective view illustrating my invention as applied to a motor vehicle.

Fig. 2 is a side elevational view of my improved lamp and bracket assembly as viewed in the direction of the arrows 2—2 of Fig. 1.

Fig. 3 is a sectional view of the bracket portion of the assembly shown in Fig. 2.

Fig. 4 is a plan view of the bracket shown in Fig. 3.

Fig. 5 is a transverse sectional view taken on the line 5—5 of Fig. 4.

Fig. 6 is a side elevational view of the assembly applied to an inclined supporting structure.

In Fig. 1 I have shown in perspective a portion of the front end of a motor vehicle, generally designated by the numeral 10, which has a front bumper 11 secured thereto. My improved fog light and bracket assembly, generally indicated by the numeral 12, is secured to the bumper 11 adjacent the upper lateral edge.

Referring now more particularly to Fig. 2, the assembly 12 comprises a mounting bracket 13 which supports and positions a lamp 14. The bracket 13 comprises a U-shaped portion including legs 15 and 16 which are separated by a groove 17. The leg 15 of the U-shaped portion of the bracket is substantialy triangular in configuration and is provided with a threaded opening 18 extending from the face of the leg adjacent the groove 17 upwardly into the leg. The threaded opening 18 is provided with a bolt 19 threaded therein, the head portion of the bolt being disposed between the legs 15 and 16 in the groove. The head portion 20 is provided with a raised circular rib 21 of triangular cross section which is adapted to bite into the upper lateral edge of the bumper 11 when the bolt 19 is rotated. The leg 16 is substantially wider than the leg 15 and is provided with three threaded openings 22 which receive set screws 23. The lower ends of the set screws are provided with conventional slots for receiving a screw driver while the upper ends thereof are provided with raised circular ribs 24 of triangular cross sectional configuration which engage the underface of the upper lateral edge of the bumper 11 on the opposite side thereof from the bolt 19. It will be seen from the drawings that the threaded openings and set screws 22 and 23, respectively, are symmetrically disposed within the leg 16 and engage the bumper 11 at three points, the rib 21 of the bolt 19 engaging the opposite face of the bumper 11 at a point substantially equidistant from the three set screws. The leg 18 is also provided with an opening 25 which is aligned with the threaded opening 18 and the leg 15 and facilitates the assembly of the bolt 19 with the leg 15, the diameter of the opening 25 being large enough to accommodate the passage of the head 20 of the bolt 19.

The bracket 13 is also provided with a lamp supoprting portion 26 which has a concave partially spherical seat 27 on the upper surface thereof. The lamp supporting portion 26 is also provided with a slot 28 which communicates between the concave seat 27 and the lower surface of the portion 26. The concave seat 27 of the portion 26 engages the convex surface 29 of a ball or dome-like member 30. The ball-like member 30 has its free ends secured to the casing 31 of the lamp 14 through an opening 32 in the casing. The ball-like member 30 is provided at its rounded portion with an elongated slot 33 which facilitates adjustment of the lamp relative to the lamp supporting portion 26 and which has a bolt 34 extending therethrough. The bolt 34 also extends through the slot 28 and projects beyond the underside of the lamp supporting portion 26. The shank end of the bolt 34 is provided with a nut 35 and washer 36 for securing the ball-like member 30 to the lamp supporting portion 26. The bolt 34 is provided with a head 37, the underface of which is concave and engages the convex surface of the ball-like member 30 and is sufficiently wide to more than span the width of the slot 33 therein. By this construction, the ball-like member 30 may be moved relative to the lamp supporting portion by merely loosening the nut 35 and moving the lamp 14 so that the shank of the bolt 34 travels through the slot 33. The slot 28 in the lamp supporting portion 26 is of a rectangular cross sectional configuration and is longer in one direction than in the other so that in the event the assembly 12 is mounted in a fashion, as shown in Fig. 6, the lamp 14 may be moved into its correct position and tipped to a straight position, the slot 28 allowing this tipping movement. The bolt 34 is centrally bored and is provided with a longitudinally extending passage 38 for allowing the passage of the lamp cord 39 therethrough.

To apply my improved assembly the set screws 23 are preset and the bracket is placed in position on the vehicle bumper so that the upper lateral edge of the bumper is disposed within the groove 17. At this point any conventional thin wrench may be applied to the head 20 of the bolt 19 from the front of the vehicle to rotate the bolt until the rib 21 engages the upper surface of the upper lateral edge of the bumper 11. By rotating the bolt in this manner the ribs on both the set screws and the bolt 19 bite into the surface of the bumper. The inherent resilience in the metal which forms the bumper 11 aids the action of the screws and the bolt in urging the upper lateral edge against the ribs. The bolt tends to bow the upper lateral edge of the bumper minutely towards the screws, due to the fact that the pressure applied by the bolt is at a point between the three set screws. After the U-shaped portion of the bracket 13 has been applied to the bumper, the nut 35 may be loosened and the lamp 14 adjusted to the proper position. After the lamp is set in this manner the nut 35 may be retightened and the entire assembly is ready for use.

In Fig. 6 I have shown the adaptation of my improved assembly to a bumper 11' which has its upper lateral edge inclined at approximately a 45° angle. It may be readily seen that the U-shaped portion of the bracket 13 is applied to this bumper in the same manner as heretofore set forth. Similarly, the nut 35 may be loosened and the lamp 14 moved in position by movement of the ball-like member 30 relative to the lamp supporting portion 26, the slot 33 in the ball-like member accommodating this movement. The slot 28 also allows the lamp to be tilted to a vertical position, since in the position shown in Fig. 6, the lamp is not rotated about a vertical axis as it would be in the position shown in Fig. 2. It will be noted also that many vehicle bumpers have portions curved backwardly towards the vehicle and that my improved assembly may be readily adapted to such a curved portion and the lamp adjusted so that the beam of light projects in the proper direction.

While I have illustrated and described but one embodiment of my invention, it is to be understood that such is for the purpose of illustration only, and it is contemplated that those skilled in the art may modify certain details without departing from the spirit or scope of the invention as defined in the claim appended hereto.

I claim:

In combination with a vehicle bumper member having a substantially horizontally extending flange projecting rearwardly from a substantially vertically extending connected wall, a substantially U-shaped bracket having spaced leg portions adapted to receive therebetween the flange of said member, three vertically adjustable, triangularly spaced, positioning screws mounted in the leg of said bracket that is normally concealed beneath said flange and behind said wall, said positioning screws being adapted to engage the concealed underside of said flange, and a vertically adjustable set screw concealingly mounted in the other leg of said bracket and arranged to project from the underside of said other leg and engage the upper side of said flange within the area defined by the aforementioned positioning screws, said set screw having adjusting means therefor located between said support flange and the underside of said other bracket leg.

References Cited in the file of this patent

UNITED STATES PATENTS

| Number | Name | Date |
|---|---|---|
| 546,081 | Reyer | Sept. 10, 1895 |
| 914,047 | Holcomb | Mar. 2, 1909 |
| 1,022,924 | Bohy | Apr. 9, 1912 |
| 1,061,328 | Sandberg | May 13, 1913 |
| 1,509,037 | Franklin | Sept. 16, 1924 |
| 1,536,900 | Lowe | May 5, 1925 |
| 1,537,039 | Short | May 5, 1925 |
| 1,679,715 | Fish | Aug. 7, 1928 |
| 1,698,615 | Wilkins | Jan. 8, 1929 |
| 1,717,106 | Holt | June 11, 1929 |
| 1,834,682 | Colstad | Dec. 1, 1931 |
| 1,861,148 | Withron | May 31, 1932 |
| 2,045,307 | Connell | June 23, 1936 |
| 2,165,689 | Trippe | July 11, 1939 |
| 2,229,194 | Sklarek | Jan. 21, 1941 |
| 2,604,818 | Morgenstern | July 29, 1952 |